United States Patent [19]
Kraus et al.

[11] 3,879,416
[45] Apr. 22, 1975

[54] METHOD FOR PREPARING INDAZOLONE DERIVATIVES

[75] Inventors: Theodore C. Kraus, Cheshire; Manfred G. Noack, Northford, both of Conn.

[73] Assignee: Olin Corporation, New Haven, Conn.

[22] Filed: July 3, 1972

[21] Appl. No.: 268,303

[52] U.S. Cl.......... 260/310 A; 252/429 R; 260/242; 260/270 PY; 260/270 D; 260/270 T; 260/270 TP; 260/299
[51] Int. Cl............................................. C07d 49/14
[58] Field of Search..................... 260/310 A, 270 R

[56] References Cited
UNITED STATES PATENTS
2,944,056    7/1960    Murahashi et al.............. 260/310 A
3,657,308    4/1972    Kober et al..................... 260/270 R

OTHER PUBLICATIONS

C.A. 54:4607 f (1960) Horiie.

J. Organometal Chem. 10:511–517 (1967) Takahashi et al.

*Primary Examiner*—Henry R. Jiles
*Assistant Examiner*—S. D. Winters
*Attorney, Agent, or Firm*—Thomas P. O'Day; Donald F. Clements; F. A. Iskander

[57]           ABSTRACT

Preparation of indazolone compounds and derivatives thereof by reacting selected azobenzene or azoxybenzene compounds with carbon monoxide in the presence of a metal halide-Lewis base catalyst complex.

10 Claims, No Drawings

METHOD FOR PREPARING INDAZOLONE DERIVATIVES

This invention relates to the preparation of indazolone compounds by a catalytic process which uses a metal halide-Lewis base catalyst complex.

Previously known techniques for preparing 2-phenylindazolone include the catalytic reaction of azobenzene with carbon monoxide using metal-carbonyl catalysts. Use of such catalysts, however, causes some handling problems since they are flammable, very air sensitive and highly toxic. Another method for preparing 2-phenylindazolone compounds has been shown by H. Takahashi and J. Tsuji in "J.Organometal Chem." 10, 511 (1967) which incorporates an azobenzene-palladium chloride complex but this reaction requires stoichiometric amounts of the palladium chloride.

Now it has been found that a simplified economical method for preparing indazolone derivatives is provided by reacting a selected azobenzene or azoxybenzene compound with carbon monoxide in the presence of a catalytic proportion of a metal halide-Lewis base catalyst complex.

The indazolone compounds prepared by the method of this invention are 2-phenylindazolone (I) and benzoylene indazolone (II) also known as 6H, 12H-indazolo [2,1-a]indazole-6,12 dione and the substituted derivatives thereof and have the following formulas:

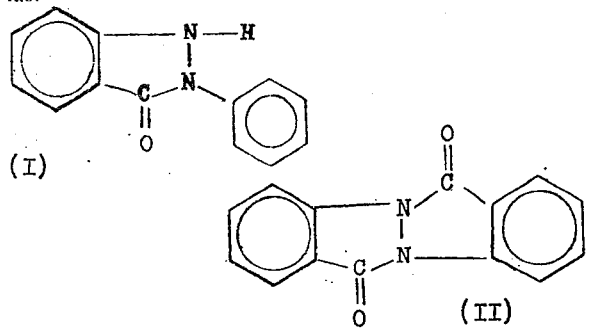

It is further noted that the phenyl groups in the above formulas may bear substituents such as alkyl, aryl, aralkyl, alkylaryl, alkoxy, halogen, alkylthio, carboxy, carbalkoxy, cyano, isocyanato and the like. The rings may contain different substituents and additionally may have more than one substituent. Reference in the specification and claims to 2-phenylindazolone (I) and benzoylene indazolone (II) is intended to include the substituted derivatives thereof.

The starting azo and azoxy materials will generally have the following formulas:

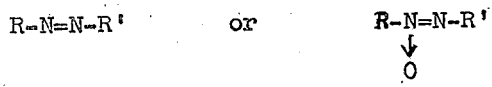

where R and R' each represent a phenyl or substituted phenyl group. The substituents contained on such phenyl groups may include alkyl of 1 to 6 carbons and preferably 1 to 4, aryl of 6 to 10 carbons and preferably 6 to 8, aralkyl of 6 to 20 carbons and preferably 6 to 14, alkylaryl of 6 to 20 carbons and preferably 6 to 14, alkoxy of 1 to 8 carbons and preferably 1 to 4, halogen, alkylthio of 1 to 8 carbons and preferably 1 to 4, carboxy and carbalkoxy of 1 to 8 carbons and preferably 1 to 4, cyano, isocyanato and the like. The substituents on the two phenyl groups may be different and more than one may be present provided at least one of the four ortho positions is free.

Illustrative of the above-described azobenzene and azoxybenzene compounds are the following: azobenzene, m,m'-azotoluene, o,o'-azotoluene, p,p'-azotoluene, 4,4'-dichloroazobenzene, 3,3'-difluoroazobenzene, 4,4'-diisocyanatoazobenzene, 3,3'-diisocyanto-4,4'-dimethylazobenzene, 3,3'-diisocyanato-2,2'-dimethylazobenzene, 4,4'-diphenylazobenzene, 2,2'-4,4'-tetrachloroazobenzene, 4,4'-azodianisole, 3,3'-azodibenzoicacid, m,p'-azotoluene, 4-bromoazobenzene, azoxybenzene, p,p'-azoxytoluene, 3,3'-dibromoazoxybenzene, 4,4'-diphenylazoxybenzene, 2-chloroazoxybenzene, etc.

The metal halide-Lewis base complex which is used in the method of this invention has the following general formula:

$$ML_2X_2$$

where M is a metal selected from the group consisting of nickel, palladium, and platinum; L is any Lewis base capable of forming a complex with the metal halide and more particularly is a heteroaromatic nitrogen compound containing between five or six members in the ring, containing only nitrogen and carbon in the ring, and containing at least two double bonds in the ring; and X is a halide or pseudo halide selected from the group consisting of chloride, bromide, iodide, fluoride, NCS⁻, SCN⁻, CN⁻, NCO⁻, and OCN⁻ with chloride, bromide and iodide being preferred.

Suitable Lewis bases (L) of the above type are disclosed in "The Ring Index" by Patterson and Capell, 2nd Edition, American Chemical Society, 1960 and Supplements I, II and III. Derivatives of the heteroaromatic nitrogen compounds may also be utilized. The term "derivatives" when used in conjunction with heteroaromatic compounds throughout the specification and claims is intended to include compounds wherein hydrogen in the parent aromatic ring has been replaced by a substituent of the following type:

I. Substituents on the ring
 a. halides such as chlorine, bromine, iodine and fluorine
 b. alkyl containing between 1 and 40 carbon atoms
 c. aryl such as phenyl, cresyl and xylyl
 d. olefinic such as allyl, vinyl
 e. hydroxy
 f. mercapto
 g. amino
 h. alkylamino
 i. cyano
 j. oximino
 k. aldehyde
 l. ethers such as aryl, alkyl, and alkenyl ethers
 m. thioethers such as aryl, alkyl, and alkenyl ethers
 n. carboxy
 o. carbalkoxy
 p. carbamyl
 q. carboaryloxy
 r. thiocarbamyl
II. Polycyclic analogues
 a. fused benzene
 b. fused cycloaliphatic
 c. fused nitrogen-containing heteroaromatic
III. Complexes with inorganic substances other than noble metal halides IV. Five membered ring containing one nitrogen
   a. 1-methyl pyrrole
   b. 1-phenyl pyrrole
V. Five membered ring containing two nitrogens
   a. imidazole
   b. 1-methyl imidazole
   c. pyrazole
VI. Fused benzene and fused nitrogen-containing heteroaromatic derivatives of five membered rings containing one nitrogen
   a. indole
   b. indolenine (3-pseudoindole)
   c. 2-isobenzazole
   d. indolizine
   e. 4aH-carbazole
   f. carbazole
VII. Six membered ring containing one nitrogen and derivatives thereof
   a. pyridine
   b. 2,6-dimethylpyridine
   c. 2,4,6-trimethylpyridine
   d. 4-phenylpyridine
   e. 2-vinylpyridine
   f. 2-styrylpyridine
   g. 2-bromopyridine
   h. 2-chloropyridine
   i. 3-chloropyridine
   j. 2,6-dichloropyridine
   k. 2-bromo-4-methylpyridine
   l. 2-fluoropyridine
   m. 2-allyloxypyridine
   n. 4-phenylthiopyridine
   o. 2-methoxypyridine
   p. picolinic acid
   q. nicotinic acid
   r. 2,6-dicyanopyridine
   s. pyridine-2-aldehyde (picolinaldehyde)
   t. 2-aminopyridine
   u. 4-dimethylaminopyridine
   v. diphenyl-4-pyridylmethane
   w. 4-hydroxypyridine
   x. 2-mercaptopyridine
   y. 2-oximinopyridine (picolinaldoxime)
   z. 4-tertiarybutylpyridine
VIII. Fused benzene and fused nitrogen-containing heteroaromatic derivatives of six membered ring containing one nitrogen
   a. quinoline
   b. 2-chloroquinoline
   c. 8-hydroxyquinoline
   d. isoquinoline
   e. acridine
   f. phenanthridine
   g. 7,8-benzoquinoline
   h. 4H-quinolizine
   i. naphthyridine
   j. carboline
   k. phenanthroline
   l. Benzo[h]isoquinoline
   m. Benzo[g]quinoline
   n. Benzo[g]isoquinoline
   o. Benzo[h]quinoline
   p. Benzo[f]quinoline
   q. Benzo[f]isoquinoline
   r. 1H-benzo[de]quinoline
   s. 4H-benzo[de]quinoline
   t. 4H-benzo[de]isoquinoline
   u. 1H-benzo[de]isoquinoline
   v. purine
   w. adenine
   x. pteridine
   y. 7H-pyrazino[2,3-c]carbazole
   z. Pyrazino[2,3-d]pyridazine
   aa. 4H-pyrido[2,3-c]carbazole
   bb. Pyrido[1',2':1,2]imidazo[4,5-b]quinoxaline
   cc. 6H-perimidine
   dd. perimidine
IX. Six membered ring containing two nitrogens and derivatives thereof
   a. pyrazine
   b. 4,6-dimethylpyrimidine
   c. 2,6-dimethylpyrazine
   d. pyridazine
X. Fused benzene and fused nitrogen-containing heteroaromatic derivatives of six membered rings containing two nitrogens
   a. quinoxaline
   b. 2,3-dimethylquinoxaline
   c. phthalazine
   d. quinazoline
   e. phenazine
   f. cinnoline
XI. Oxides
   a. Oxides include oxides of quinoline, pyridine, isoquinoline and imazaole, and are illustrated by the following oxides:
      1. pyridine-1-oxide
      2. 4-bromopyridine-1-oxide
      3. 2-hydroxypyridine-1-oxide
      4. picolinic acid-1-oxide
      5. 4-methoxy pyridine-1-oxide
      6. 2-bromo-6-methylpyridine-1-oxide
      7. 2-picoline-1-oxide
      8. 4-picoline-1-oxide
XII. Mixtures of two or more of the above noted derivatives.

It is further noted that when referring to the Lewis base and/or heteroaromatic nitrogen compound in the specification or claims, it is intended to include derivatives of the above-noted types.

The most preferred heteroaromatic compounds are pyridine, quinoline, isoquinoline and mixtures thereof.

Particularly preferred catalyst complexes are dichlorobis(pyridine) palladium, dichlorobis(isoquinoline) palladium, dichlorobis(4-phenylpropyl pyridine) palladium and diiodobis(quinoline) nickel.

Any convenient technique may be used to prepare a catalyst complex. In one technique, the metal halide and heteroaromatic nitrogen compound may be first reacted in a suitable solvent such as monochlorobenzene, dichlorobenzene, ethanol or an excess of the heterocyclic nitrogen compound to form an organic metal halide complex, which is then isolated as a crystalline solid and added to the reaction mixture. For example, pyridine may be reacted with palladous dichloride in anhydrous organic media to form the respective dichlorobis(pyridine) palladium.

Another example for preparing a catalyst complex as used in this invention is as follows: anhydrous nickel (II) iodide and the Lewis base is refluxed until a solid product is obtained, the excess Lewis base is decanted, the solid product is washed with boiling alcohol, and the resulting solid is separated from the alcohol solution after cooling. This technique is described in Journal of the American Chemical Society, vol. 84, pp. 2014–15, (1962).

Other suitable catalyst complexes and other techniques for preparing them may be found in "Advanced Inorganic Chemistry" by Cotten and Wilkinson, 1962.

The catalyst complex can be self-supporting or deposited on a support or carrier for dispersing the catalyst complex to increase its effective surface. Alumina, silica, carbon, barium sulfate, calcium carbonate, asbestos, bentonite, diatomaceous earth, fuller's earth and analogous materials are useful as carriers for this purpose.

The azo or azoxy compounds used as starting materials can be prepared by methods well known in the art such as the reduction of nitro compounds as disclosed in "Organic Chemistry" by Cram and Hammond, 1959, pp. 448 and 449. A technique for preparing aromatic azoxy compounds is disclosed in U.S. Pat. No. 3,644,327.

The reaction is carried out in the presence of a catalytic proportion of the catalyst complex. The proportion of catalyst complex is generally equivalent to between about 0.01 and about 500 percent and preferably between about 0.1 and about 50 percent by weight of the azo or azoxy compound. However, greater or lesser proportions may be employed if desired.

The process of this invention operates effectively in the absence of a solvent, but improved overall yields of the desired product can be obtained when a solvent which is chemically inert to the components of the reaction system is employed. Suitable solvents include aliphatic, cycloaliphatic and aromatic solvents such as n-heptane, cyclohexane, benzene, toluene, and xylene, and halogenated aliphatic and aromatic hydrocarbons such as dichloromethane, tetrachloroethane, trichlorotrifluoroethane, monochloronaphthalene, monochlorobenzene, dichlorobenzene, trichlorobenzene, perchloroethylene, aromatic nitro compounds such as nitrobenzene, mixtures thereof and the like.

The proportion of solvent is not critical and any proportion may be employed which will not require excessively large equipment to contain. Generally the weight percent of azo or azoxy compound in the solvent is in the range between about 2.0 and about 80 percent, but greater or lesser proportions may be employed if desired.

The order of mixing the reactants is not critical and may be varied within the limitations of the equipment employed. In one embodiment, the azo or azoxy compound, catalyst complex and, if desired, solvent, is charged to a suitable pressure vessel such as an autoclave which was previously purged with nitrogen, and which is preferably provided with agitation means such as a stirrer or an external rocking mechanism. At start-up, carbon monoxide is fed into the autoclave until a pressure is attained at ambient temperature which is generally between about 30 and about 15,000 psig. After the reaction proceeds and heat is applied, the pressure may increase to as high as 30,000 psig. However, greater or lesser pressures may be employed if desired.

Generally, the quantity of carbon monoxide in the free space of the reactor is sufficient to maintain the desired pressure as well as provide reactant for the process, as the reaction progresses. If desired, additional carbon monoxide can be fed to the reactor either intermittently or continuously as the reaction progresses.

The total amount of carbon monoxide added during the reaction is generally between about 1 and about 50 and preferably between about 2 and about 15 moles of carbon monoxide per nitrogen atom in the azo or azoxy compound. Greater or lesser amounts may be employed if desired. The highest carbon monoxide requirements are generally utilized in a process in which the carbon monoxide is added continuously, but suitable recycle of the carbon monoxide containing gas streams greatly reduces the overall consumption of carbon monoxide.

The reaction temperature is generally maintained between about 50° and about 400°C. and preferably between about 100° and about 300°C. Interior and/or exterior heating and cooling means may be employed to maintain the temperature in the reactor within the desired range.

The reaction time is dependent upon the azo or azoxy compound being reacted, temperature, pressure, and on the amount of catalyst being charged, as well as the type of equipment being employed. Usually between about 10 minutes and about 20 hours are required to obtain the desired degree of reaction in a batch technique, but shorter or longer reaction times may be employed. In a continuous process, the reaction period may be much lower, i.e., substantially instantaneous, and residence time may be substantially less than batch reaction time.

The reaction can be carried out batchwise, semicontinuously or continuously.

After the reaction is completed, the temperature of the crude reaction mixture may be dropped to ambient temperature, the pressure vessel is vented, and the reaction products are removed from the reaction vessel. Filtration or other suitable solid-liquid separation techniques may be employed to separate the catalyst from the reaction product.

The indazolone compounds prepared in accordance with the method of this invention are suitable for use as valuable intermediates for producing dyestuffs, medicines and industrial chemicals.

The following examples are presented to describe the invention more fully without any intention of being limited thereby.

EXAMPLE I

A glass liner of 80 ml capacity equipped with stopper and a small lateral opening was charged with 4.5 g azobenzene, 6.5 g ortho-dichlorobenzene as solvent, and 0.36 g Pd(pyridine)$_2$Cl$_2$ as catalyst and placed in a stainless steel autoclave of 300 ml capacity. The autoclave was subsequently pressurized with 3150 psig. CO, then sealed and placed in an electrical furnace where a temperature of 200°C. was maintained for 3 hours while the reactants were agitated by rocking motions at a rate of 36 cycles per minute. At the end of this period the apparatus was allowed to cool to ambient temperature after which time CO was vented and the glass liner removed. Filtration of the solids and liquid thus obtained gave 1.9 g solids and a filtrate. A sample of said solid was recrystallized using ethanol giving yellow needles melting at 301°C. and analyzing as $C_{14}H_8N_2O_2$. Structural analyses by infrared, nuclear magnetic resonance (NMR) and mass spectroscopy confirmed the structure of this material as benzoylene indazolone.

The addition of petroleum ether to the aforementioned filtrate precipitated more solid which, by analyses as described above, was shown to contain a mixture of 2-phenylindazolone and benzoylene indazolone.

EXAMPLE II

The procedure of Example I was repeated using 4.8 g of azoxybenzene as starting material. The resulting reaction mixture contained both 2-phenylindazolone and benzoylene indazolone.

EXAMPLE III

The procedure of Example I was repeated using 0.62 g Ni(quinoline)$_2$I$_2$ as catalyst and the temperature was held at 220°C. for 3 hours. A total amount of 3.0 g solids was isolated as described in Example I and shown to consist primarily of 2-phenylindazolone.

What is claimed is:

1. A method for preparing an indazolone compound selected from the group consisting of 2-phenylindazolone, benzolylene indazolone and substituted derivatives thereof which comprises reacting
   A. an azo or azoxy compound having a formula selected from the group consisting of:
      (1) R — N = N — R', and
      (2) R - N = N - R'
                $\quad\quad\downarrow$
                $\quad\quad$O wherein each R and R' in said azo or azoxy compound is a phenyl or substituted phenyl group, said substituents being selected from the group consisting of alkyl of 1 to 6 carbon atoms, aryl of 6 to 10 carbon atoms, aralkyl and alkylaryl of 6 to 20 carbon atoms, alkoxy and alkylthio of 1 to 8 carbon atoms, halogen, carboxy and carbalkoxy of 1 to 8 carbon atoms, cyano and isocyanato with the proviso that at least one of the four ortho positions is free with
   B. carbon monoxide
   C. at an elevated temperature and
   D. at an elevated pressure
   E. in the presence of a catalytic amount of a metal halide-Lewis base catalyst complex having the formula:

ML$_2$X$_2$ wherein M is a metal selected from the group consisting of nickel, palladium and platinum; L is a Lewis base selected from the group consisting of pyridine, quinoline and isoquinoline; and X is a halide or pseudo halide.

2. The method of claim 1 wherein said halide or pseudo halide is selected from the group consisting of chloride, bromide, iodide, fluoride, NCS$^-$, SCN$^-$, CN$^-$, NCO$^-$ and OCN$^-$.

3. The method of claim 2 wherein said alkyl group contains from 1 to 4 carbon atoms, said aryl group contains 6 to 8 carbon atoms, said aralkyl and alkylaryl contains from 6 to 14 carbon atoms and said alkoxy and alkylthio contains from 1 to 4 carbon atoms.

4. The method of claim 3 wherein the proportion of said catalyst is between about 0.01 and about 500 percent by weight of said azo or azoxy compound.

5. The method of claim 4 wherein X is a halide selected from the group consisting of chloride, bromide and iodide.

6. The method of claim 3 wherein said elevated temperature is in the range of between about 50° and about 400°C. said elevated pressure is in the range of between about 30 and about 15,000 psig. and the proportion of carbon monoxide is in the range of between about 1 and about 50 moles of carbon monoxide per nitrogen atom in the azo or azoxy compound.

7. The method of claim 6 wherein said azo or azoxy compound is selected from the group consisting of azobenzene and azoxybenzene.

8. The method of claim 7 wherein the proportion of said catalyst is between about 0.01 and about 500 percent by weight of said azo or azoxy compound.

9. The method of claim 8 wherein X is a halide selected from the group consisting of chloride, bromide and iodide.

10. The method of claim 9 wherein said catalyst is selected from the group consisting of dichlorobis(pyridine) palladium and dichlorobis(isoquinoline) palladium and diiodobis(quinoline) nickel.

* * * * *